United States Patent
Walker et al.

(10) Patent No.: US 10,219,435 B2
(45) Date of Patent: Mar. 5, 2019

(54) CORN HEADER FOR AN AGRICULTURAL HARVESTER HAVING AN ACTIVE HOOD

(71) Applicant: CNH Industrial America LLC, New Holland, PA (US)

(72) Inventors: Eric Walker, Narvon, PA (US); Christopher Craft, Sparks, MD (US)

(73) Assignee: CNH Industrial America LLC, New Holland, PA (US)

( * ) Notice: Subject to any disclaimer, the term of this patent is extended or adjusted under 35 U.S.C. 154(b) by 68 days.

(21) Appl. No.: 15/357,072

(22) Filed: Nov. 21, 2016

(65) Prior Publication Data

US 2018/0139902 A1   May 24, 2018

(51) Int. Cl.
*A01D 45/02* (2006.01)
*A01D 41/06* (2006.01)

(52) U.S. Cl.
CPC ........... *A01D 45/025* (2013.01); *A01D 41/06* (2013.01); *A01D 45/021* (2013.01)

(58) Field of Classification Search
CPC .. A01D 45/021; A01D 45/025; A01D 43/082; A01D 45/02; A01D 57/22
USPC .................................................. 56/103, 104
See application file for complete search history.

(56) References Cited

U.S. PATENT DOCUMENTS

| | | | |
|---|---|---|---|
| 1,777,112 A | 9/1930 | Baker | |
| 2,234,447 A | 3/1941 | Clifford | |
| 2,341,248 A * | 2/1944 | Urschel | A01D 45/02 56/103 |
| 2,542,617 A | 2/1951 | Barney | |
| 2,870,593 A | 1/1959 | Anderson | |
| 2,906,083 A | 9/1959 | Rettig | |
| 2,949,716 A | 8/1960 | Thomson | |
| 3,069,832 A * | 12/1962 | Baker | A01D 45/021 460/32 |
| 3,646,737 A | 3/1972 | Grant | |
| 3,803,820 A | 4/1974 | Knapp | |
| 4,048,792 A | 9/1977 | Shriver et al. | |
| 4,215,527 A | 8/1980 | Shriver et al. | |
| 4,346,548 A | 8/1982 | Atkinson | |
| 4,377,062 A | 3/1983 | Slattery | |
| 4,476,667 A | 10/1984 | Moss | |
| 4,524,571 A | 6/1985 | Mak et al. | |
| 5,775,076 A | 7/1998 | Mossman | |
| 5,787,696 A * | 8/1998 | Wiegert | A01D 45/021 241/260.1 |
| 5,913,803 A * | 6/1999 | Moster | A01D 45/021 460/114 |
| 7,021,038 B2 | 4/2006 | Priepke | |
| 7,373,767 B2 | 5/2008 | Calmer | |

(Continued)

FOREIGN PATENT DOCUMENTS

EP  0185836 A1  7/1986
WO  2012087904 A1  6/2012

*Primary Examiner* — Arpad Fabian-Kovacs
(74) *Attorney, Agent, or Firm* — Peter K. Zacharias; Patrick M. Sheldrake

(57) ABSTRACT

A header for a combine harvester is provided. The header includes a frame, a row unit and a pair of rollers. The row unit extends forwardly of the frame and includes a pair of stalk rolls and a pair of deck plates. The pair of rollers are spaced from and above the pair of stalk rolls. The present invention improves harvesting efficiency by reducing grain loss and reducing damage to ears of stalks during harvesting operations.

20 Claims, 11 Drawing Sheets

(56) References Cited

U.S. PATENT DOCUMENTS

| | | | |
|---|---|---|---|
| 7,752,829 B1* | 7/2010 | Rottinghaus | A01D 45/021 56/110 |
| 7,866,136 B1 | 1/2011 | Hill et al. | |
| 8,166,738 B1 | 5/2012 | Coers et al. | |
| 8,220,237 B1 | 7/2012 | Calmer | |
| 8,286,410 B2 | 10/2012 | Priepke et al. | |
| 8,720,172 B2 | 5/2014 | Lohrentz et al. | |
| 9,210,842 B2* | 12/2015 | Lohrentz | A01D 45/021 |
| 2002/0014064 A1* | 2/2002 | Wubbels | A01D 45/021 56/95 |
| 2003/0079458 A1* | 5/2003 | Wubbels | A01D 45/021 56/52 |
| 2011/0041472 A1* | 2/2011 | Rottinghaus | A01D 45/021 56/119 |
| 2012/0042621 A1* | 2/2012 | Lohrentz | A01D 45/021 56/109 |
| 2012/0042623 A1* | 2/2012 | Lohrentz | A01D 45/021 56/113 |
| 2012/0047864 A1* | 3/2012 | Lohrentz | A01D 45/021 56/95 |
| 2012/0055132 A1* | 3/2012 | Lohrentz | A01D 45/021 56/62 |
| 2012/0055133 A1* | 3/2012 | Lohrentz | A01D 45/021 56/94 |
| 2012/0204528 A1* | 8/2012 | Regier | A01D 45/021 56/62 |
| 2017/0099775 A1* | 4/2017 | Barry | A01F 11/06 |

* cited by examiner

CORN HEADER FOR AN AGRICULTURAL HARVESTER HAVING AN ACTIVE HOOD

FIELD OF THE INVENTION

The present invention relates generally to corn headers for use with agricultural harvesters. In particular, the present invention relates to a hood for a corn header having active rollers for improved and efficient processing of crop stalks therebetween.

BACKGROUND OF THE INVENTION

An agricultural combine is a machine used to harvest a variety of crops from a field. During a harvesting operation, a corn header at the front of the combine cuts ripened crop from the field. The corn header includes row dividers that direct rows of corn stalks to ear separation chambers or stripping plates and then to an auger. The auger advances the crop towards the vehicle centerline. A feederhouse of the combine then transfers the crop material into the combine by way of a conveyor such as an elevator assembly.

The row dividers in combination with row units having gathering chains, stripping plates, and stalk rolls process the harvested crops. As the stalk rolls rotate, the flutes on the stalk rolls pinch and pull the corn stalks downward. Two stripper plates located above the stalk rolls and on both sides of the corn row are spaced wide enough to allow the corn plant to pass between them but are narrow enough to retain the ears of corn. As a result, the ears of corn are separated from the corn plant as it is pulled rapidly between these stripping plates. The ears of corn are then transferred by the gathering/conveying chains into the next conveying system for delivery to the combine for ultimate threshing and separation of the kernels.

When the ears of corn are pulled into the header, the ears accelerate to the speed of the stalk rolls. As a result, the ears bounce and shatter when they hit the hoods or deck plates. This is sometimes referred to as "butt-shelling." The ears bouncing and shattering result in damage to the ears of corn within the row unit and increase grain losses during harvesting operations.

Therefore, there is still a need for a header that reduces grain loss during harvesting operations. The present invention addresses the foregoing issues of conventional headers.

BRIEF SUMMARY OF THE INVENTION

In accordance with an exemplary embodiment of the present invention, there is provided a header of a combine harvester, the header comprises a frame, a row unit extending forwardly of the frame, and a pair of rollers. The row unit includes a pair of stalk rolls and a pair of deck plates. The pair of rollers are spaced from and above the pair of stalk rolls.

In accordance with another exemplary embodiment of the present invention, there is provided a header of a combine harvester, the header comprises a frame, a plurality of row units extending forwardly from the frame, first and second spaced apart hoods, a first roller assembly mounted to the first hood, and a second roller assembly mounted to the second hood. Each of the first and second spaced apart hoods extend between an adjacent pair of row units. The first roller assembly includes a first roller and a first actuator to move the first roller between first and second positions. The second roller assembly includes a second roller and a second actuator to move the second roller between first and second positions.

In accordance with yet another exemplary embodiment of the present invention, there is provided a set of powered rollers about a top surface or area on a hood of a header of a combine harvester. The rollers are formed of a pliable material such that the rollers can deflect enough for an ear of corn to squeeze between the rollers. A gap between the rollers is adjustable such that different sizes of ears can be accommodated. The rollers can be free rotating, mechanically powered, electrically powered or hydraulically powered. The rollers may have either a smooth or corrugated surface to adjust how aggressive they engage corn stalks. A cushioning pressure of the rollers can also be adjustable, for example, by changing air pressure inside the rollers.

In conventional harvesting operations when a corn stalk is pulled into a header an ear of the corn stalk is accelerated to the speed of a stalk roll. A subsequent force imparted on the ear causes the ear to bounce and shatter when it hits a hood or deck plate. Ears bouncing or shattering increase grain losses at the header. Also, in down crop, the hoods are static and do not aid in pulling in crop. Hoods on a header also provide shielding that is used between row units to keep corn in the header.

In accordance with an exemplary embodiment of the present invention, there is provided a pair of hoods of a corn header designed to mount a pair of rollers thereby defining an active hood. The active hood of the corn header operates by actively pulling corn stalk into the header and creating a moving surface above a pair of stalk rolls. The active hood includes two rollers mounted in line with the stalk rolls but above a pair of deck plates. The rollers also have an adjustable gap between them so that different size ears can pass through. The rollers can be formed from a pliable material and be adjustable in firmness. As the rollers rotate, they guide the stalk and ear into the row unit. The rollers capture ears and loose grain once it is under the roller to reduce losses. Alternatively, the rollers can be designed with suitable different materials and surface configurations. For example, the surface configurations can include straight flutes, spiral flutes and/or corrugations.

The resultant advantages of the exemplary embodiments of the present invention include lowering grain losses during harvesting operations and less ear bouncing thereby reducing damage to ears passing through a harvester. Additionally, a rolling action of a pair of rollers in accordance with an exemplary embodiment of the present invention creates an active surface which aids in pulling down corn stalks into a header. Such an active hood in accordance with the exemplary embodiments of the present invention reduces grain loss and reduces crop damage to ears of corn during harvesting operations.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently desired. It should be understood, however, that the invention is not limited to the precise arrangements and instrumentalities shown.

In the drawings.

DETAILED DESCRIPTION OF THE INVENTION

Figure 1:
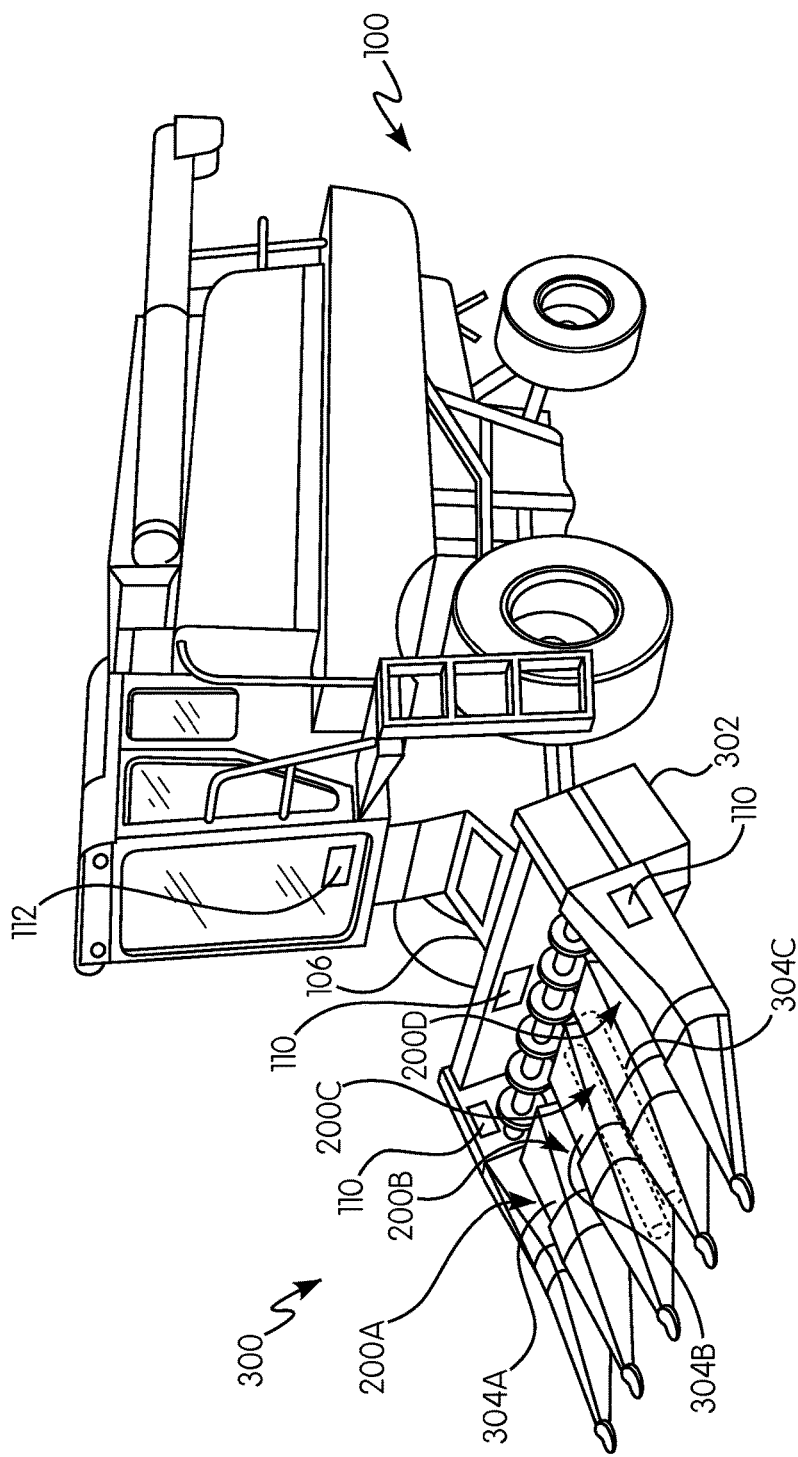
FIG. 1 is a perspective view of a combine harvester in accordance with an exemplary embodiment of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Figure 2:
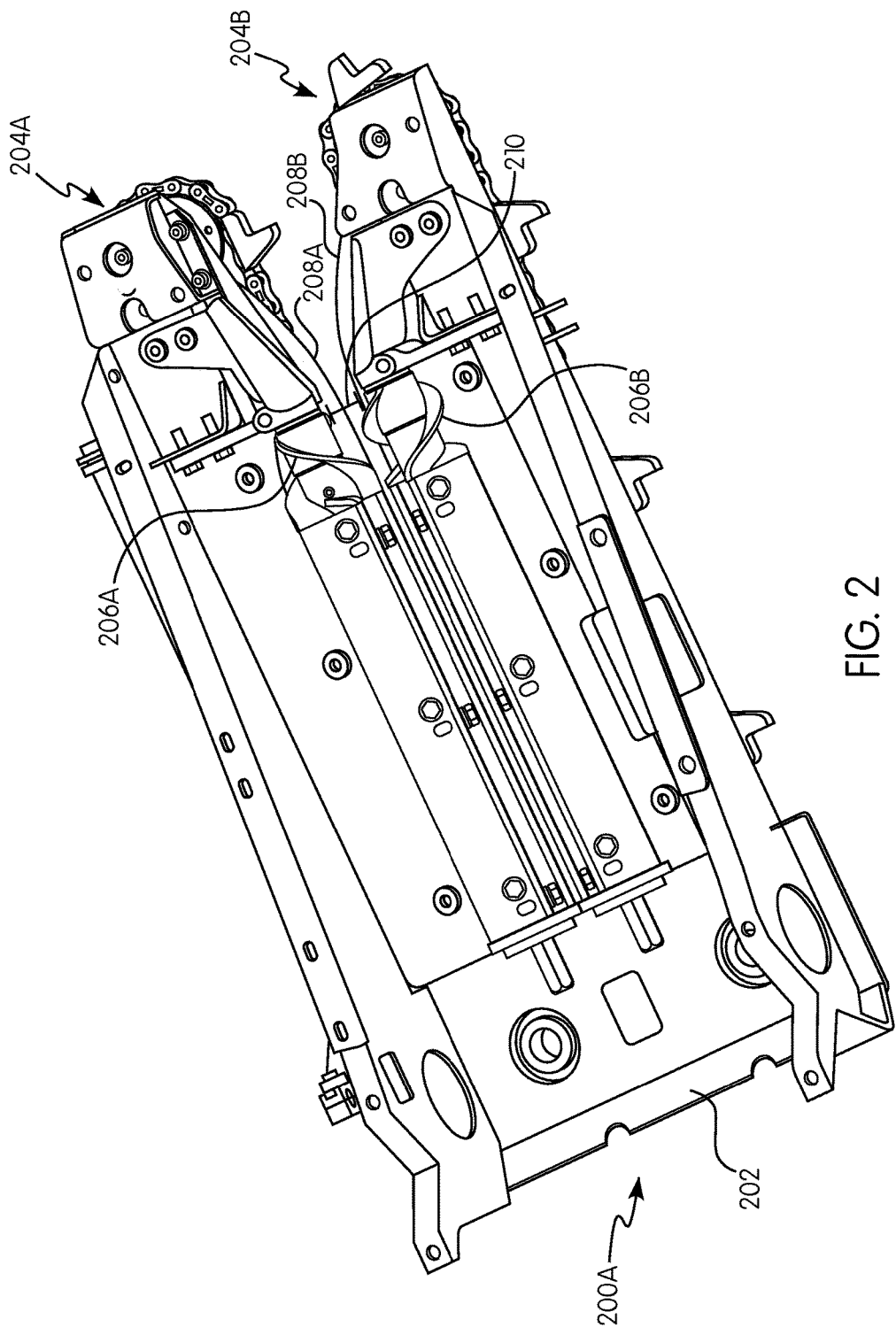
FIG. 2 is a bottom perspective view of a row unit of a header in accordance with an exemplary embodiment of the present invention with certain parts omitted.
Figure 3:
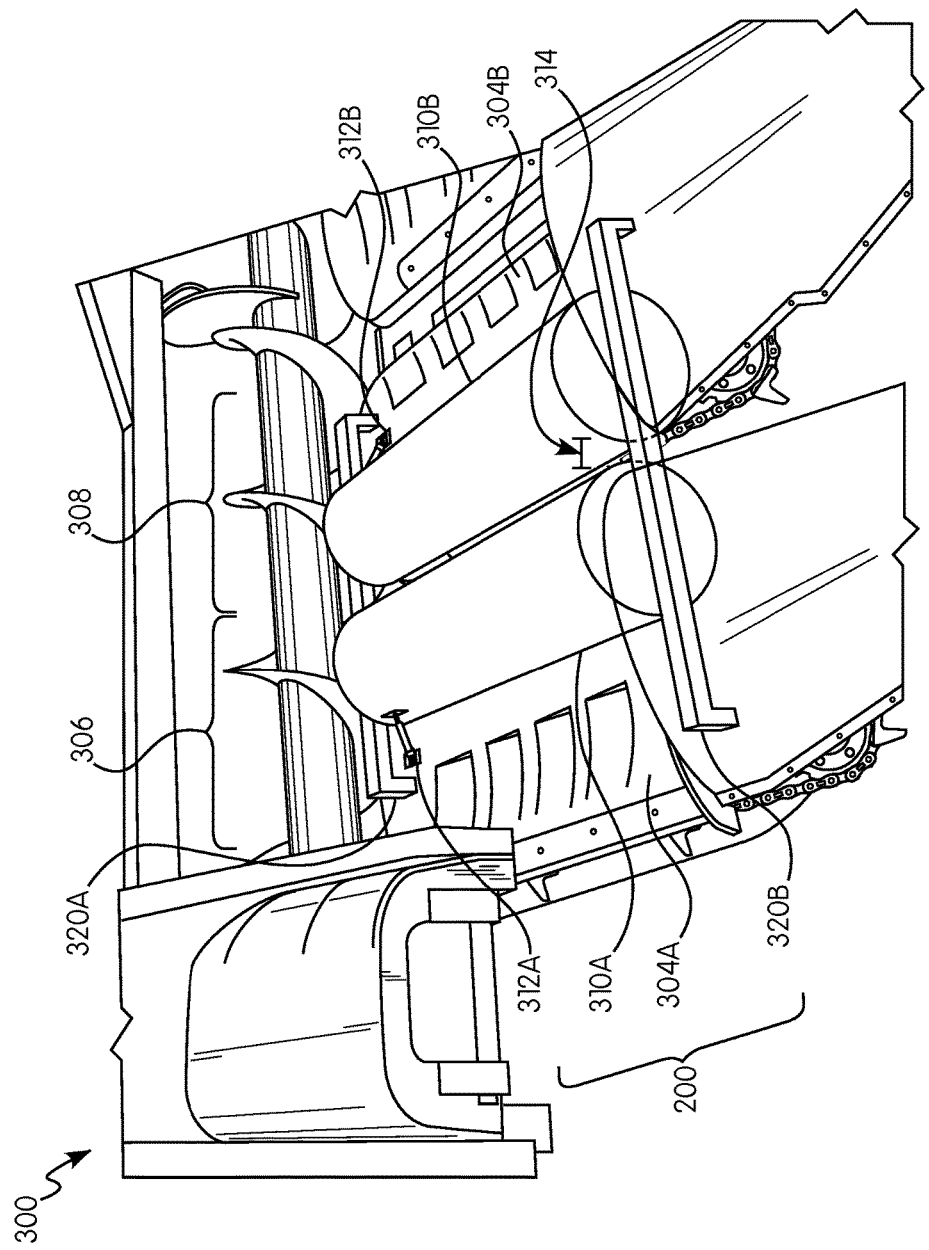
FIG. 3 is an enlarged partial perspective view of a header in accordance with an exemplary embodiment of the present invention.

Referring now to the drawings wherein exemplary embodiments in accordance with the present invention are shown, FIGS. 1-3 illustrate a header 300 in accordance with an exemplary embodiment as applied to agricultural harvester 100. The agricultural harvester e.g., a combine harvester 100, includes the header 300 having a frame 302 for mounting to a forward end of the combine harvester 100, a plurality of row units 200A-D extending forwardly from the frame 302, a pair of spaced apart hoods 304A-C, a first roller assembly 306 and a second roller assembly 308 (FIG. 3).

The header 300 can be a corn header, and the corn header will be used herein to describe an exemplary embodiment in accordance with the present invention. As shown in FIG. 1, corn header includes the plurality of row units 200A-D operatively connected to the combine harvester 100 for harvesting corn and feeding the corn to a feederhouse 106 for receiving crop material and propelling the crop material rearwardly for further downstream processing within the combine harvester.

In accordance with an exemplary embodiment of the present invention, the row unit 200A is configured as best shown e.g., in FIG. 2. For purposes of illustration, only row unit 200A is further described below. It is to be understood, however, that row units 200B-D are similarly configured to row unit 200A. The row unit 200A includes a row unit frame 202 forming two row unit arms 204A, 204B, a pair of stalk rolls 206A, 206B, and a pair of deck plates 208A, 208B. The stalk rolls 206A, 206B are shown positioned adjacent to deck plates 208A, 208B and define a gap 210 therebetween.

The first and second spaced apart hoods 304A, 304B are configured as shown e.g., in FIG. 3. Each of the hoods 304A, 304B extend between an adjacent pair of row units. For purposes of clarity, the row units are generally designated as 200 in FIG. 3. Each hood 304A, 304B is generally configured as having a substantially rectangular plan view profile. However, the hood can alternatively be configured as any other shape suitable for its intended purpose e.g., cubical, cylindrical, parallelogram and the like, in accordance with exemplary embodiments of the present invention. In each configuration, each hood 304A, 304B is sized and shaped sufficiently to extend above and cover portions of respective row unit arms along with their respective stalk rolls 206A, 206B and deck plates 208A, 208B.

The header 300 includes the first roller assembly 306 and second roller assembly 308. The first roller assembly 306 and second roller assembly 308 are configured as shown in FIG. 3 in accordance with an exemplary embodiment of the present invention. The first roller assembly 306 is mounted to the first hood 304A and includes a first roller 310A and a first actuator 312A to move the first roller 310A between first and second positions. Similarly, the second roller assembly 308 is mounted to the second hood 304B and includes a second roller 310B and second actuator 312B to move the second roller 310B between first and second positions. For purposes of clarity, the present exemplary embodiment refers to both first and second roller assemblies 306, 308 in the figures, but only the structure of the first roller assembly 306 will be generally described below and it is to be understood that the second roller assembly 308 is a mirror image construction of the first roller assembly 306. Specifically, each roller assembly 306, 308 has a respective roller 310A, 310B and actuator 312A, 312B.

As shown in FIG. 3, the first and second rollers 310A, 310B are shown spaced from and above the pair of stalk rolls 206A, 206B. The first roller 310A and second roller 310B are spaced from each other and define an elongated gap 314 therebetween. Specifically, the elongated gap 314 defined by the pair of rollers 310A, 310B is vertically aligned with the gap 210 defined by the pair of stalk rolls 206A, 206B (FIG. 2).

The width of the elongated gap 314 may vary along a longitudinal axis of the rollers 310A, 310B. For example, the rollers 310A, 310B can be adjustably positioned such that the elongated gap 314 increases or decreases from front to back. Specifically, the front ends of the rollers can be spaced apart further than the back ends of the rollers such that the elongated gap 314 between rollers 310A, 310B decreases from front to back. Similarly, the back ends of the rollers can be spaced apart further than the front ends of the rollers such that the elongated gap 314 between rollers 310A, 310B increases from front to back. Additionally, the particular width of elongated gap 314 may be selected based on the specific characteristics of the crop type or type of crop being harvested. In the present exemplary embodiment, the elongated gap 314 defined by the pair of rollers 310A, 310B is larger than the gap 210 defined by the pair of stalk rolls 206A, 206B.

Each of the rollers 310A, 310B is generally cylindrically shaped and has a substantially circular cross-section. However, the rollers 310A, 310B can alternatively be configured as having any other shape suitable for its intended purpose e.g., cubical, spherical, parallelpiped and the like. Additionally, the rollers may be fashioned so that the cross-sectional shape of the rollers 310A, 310B changes along its axial length. Each of the rollers 310A, 310B have a length substantially similar to a length of each of the pair of stalk rolls 206A, 206B and have a rotational axis parallel to a rotational axis of respective stalk rolls 206A, 206B.

Figure 4:
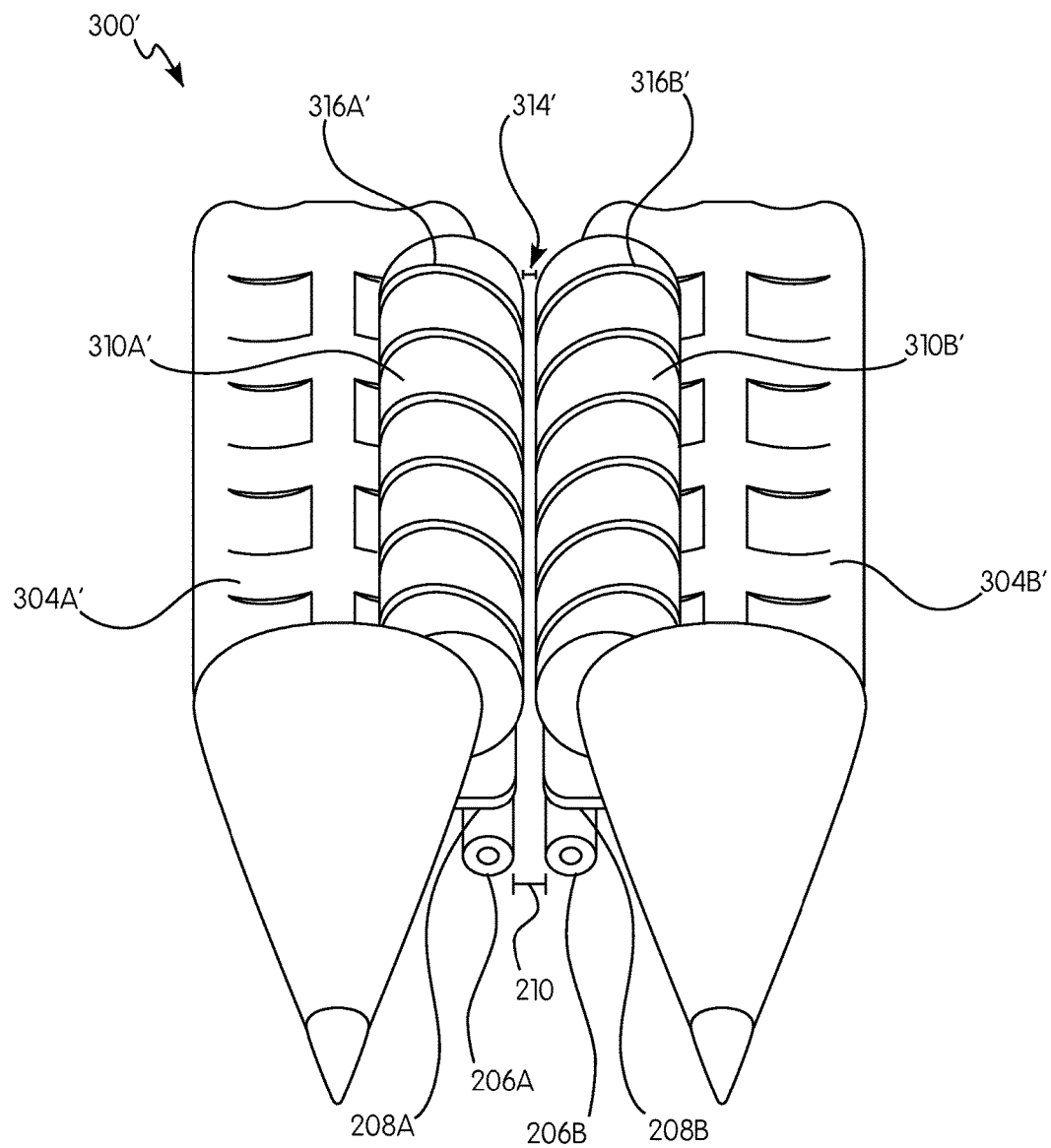
FIG. 4 is a top perspective view of a row unit of a header in accordance with another exemplary embodiment of the present invention with certain parts omitted.

FIG. 4 illustrates a top perspective view of a header 300' in accordance with a second exemplary embodiment of the present invention with certain parts omitted. The header 300' is operatively connected to the combine harvester 100 and includes a pair of stalk rolls 206A, 206B and a pair of deck plates 208A, 208B. Stalk rolls 206A, 206B are shown positioned adjacent to deck plates 208A, 208B and define a gap 210 therebetween. Similar to the exemplary embodiment shown in FIG. 3, first and second spaced apart hoods 304A', 304B' extend above the row units. Each hood is illustrated with only a single roller for purposes of illustrating a pair of rollers applicable to a row unit. Hood 304A', is mounted with roller 310A' and hood 304B' is mounted with roller 310B'. The first roller 310A' and second roller 310B' are spaced from each other and define an elongated gap 314' therebetween.

Figure 5:
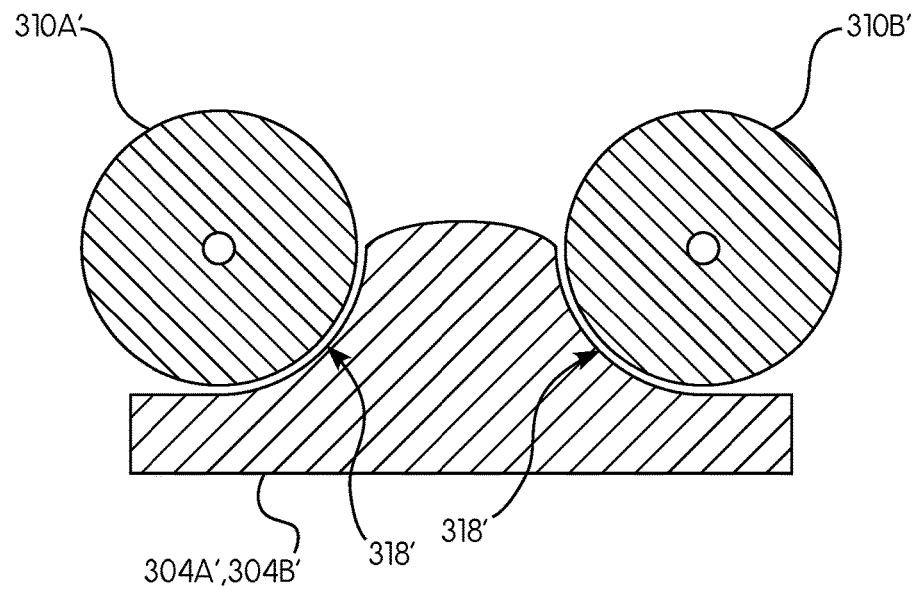
FIG. 5 is a cross-sectional elevational view of a pair of rollers of the row unit of FIG. 4 in accordance with another exemplary embodiment of the present invention.

In contrast to the hoods 304A, 304B, each hood 304A', 304B' includes a pair of concave surfaces 318' for partially receiving a respective roller. For purposes of clarity, FIG. 5 illustrates a cross-sectional view of a single hood 304A' with the pair of concave surfaces 318'. It is to be understood, however, that hood 304B' is similarly configured to hood 304A'. The hood 304A' is shaped and configured for receiving rollers 310A', 310B' of the present invention. Specifically, the hood 304A' includes concave surfaces 318' substantially complementary to the cylindrical shape of each roller 310A', 310B'. In other words, each concave surface 318' follows along an arc of the circular edge of the respective roller 310A', 310B'. The rollers 310A', 310B' and the hood 304A' are positioned in close proximity to prevent crop debris and other material from impeding rotation of the rollers 310A', 310B'.

Figure 5A:
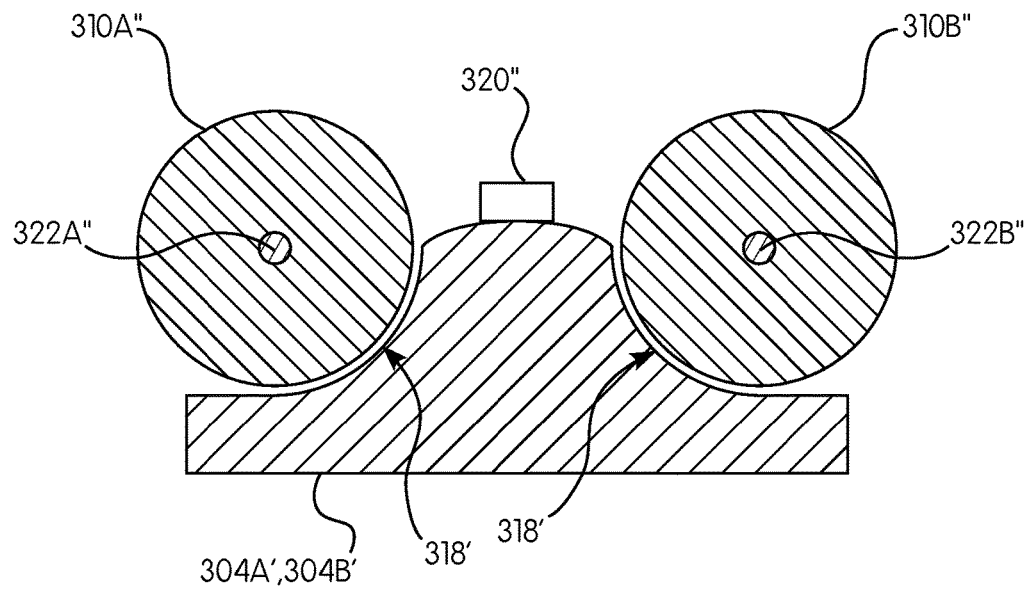
FIG. 5A is a cross-sectional elevational view of a pair of rollers of the row unit of FIG. 4 in accordance with yet another exemplary embodiment of the present invention.

In accordance with another exemplary embodiment of the present invention as shown in FIG. 5A, the pair of rollers are configured as powered rollers 310A'', 310B''. Each of the rollers 310A'', 310B'' is configured as a cylindrical shell formed by two semi-cylindrical pieces that are clamped about a drive shaft 322A'', 322B'' for each roller 310A'', 310B''. As further discussed below, the pair of rollers 310A'', 310B'' are operatively powered via a drive mechanism 320'' e.g., a motor, a hydraulic means, or a chain/belt drive. The two semi-cylindrical pieces can be secured together by fasteners e.g., bolts, thereby securing the rollers 310A'', 310B'' to their respective drive shafts. The respective drive shafts support the shape of the rollers and facilitate rotation of the rollers 310A'', 310B'' during harvesting operations as further discussed below. It is to be understood that, what is referred to herein as a cylindrical shell of the rollers need not be fashioned as a cylinder. Rather, the rollers may be configured as having any shape suitable for their intended purpose e.g., cubical, spherical, parallel piped and the like.

During harvesting operations when corn is pulled into the header, the ear of a crop is accelerated to the speed of the stalk rolls. The force imparted on the ears causes the ear to bounce and shatter when it hits the hood or deck plates of the harvester. The pair of rollers 310A, 310B decrease damage to the ears by providing an active surface which reduces ear bouncing. In accordance with an exemplary embodiment of the present invention, the pair of rollers 310A, 310B can be formed from a pliable material to allow crops of varying thickness, diameter and strength to squeeze between the rollers without damaging the crops. The pliable material can be e.g., an elastic reinforced polyester/nylon composite, but alternatively can be a rubber or any pliable material suitable for the intended purpose.

Each of the pair of rollers can have a smooth or textured outer surface to adjust their aggressiveness based on the specific characteristics of the crop being harvested or as desired by an operator of the combine harvester. Additionally, the textured outer surface can include corrugations, straight flutes, spiral flutes, ribs or protrusions depending on the type of crop being harvested and the operating conditions of the combine harvester. Crop and operating conditions, of course, may vary the full range from thin growth versus thick (i.e., light versus heavy), large diameter stalks versus small diameter, tall crops versus short, hard stalks versus soft, presence of leaves versus absence, wet crops versus dry, and the like. With each of these variations, the operator can customize the rollers to locate or identify the most desirable combination between aggressiveness of the rollers and conditioning performance that will give an efficient and effective crop harvest.

Referring to FIG. 4, there is illustrated an exemplary embodiment of the present invention, wherein the diameter of each roller 310A', 310B' is greater than the diameter of each stalk roll 206A, 206B. Alternatively, the rollers 310A, 310B may be constructed such that the diameter of the rollers 310A, 310B is proportional to the diameter of the stalk rolls 206A, 206B. For example, the ratio between the diameter of the rollers to the diameter of the stalk rolls is about 2:1. Therefore, if the stalks rolls have a diameter of 4 inches, the rollers are designed to have a diameter of 8 inches. Alternatively expressed, the diameter of the stalk rolls is 50 percent of the diameter of the rollers.

The rollers 310A, 310B can be configured as relatively smooth rollers to easily allow stems of stalks to pass therebetween. In accordance with an exemplary embodiment of the present invention, the rollers have a circular shaped cross-section and are cylindrical without any ridges or edges. Thus, their surface is entirely smooth. Other alternative designs can also be used, for example, such as rollers of different diameters, or a smooth roller of steel for its crushing action paired with another smooth roller of rubber for its enhanced gripping action. It is to be understood that the rollers of the present invention can be made of various materials and with various surface tread patterns to increase or decrease the aggressiveness of the rollers in engaging and processing crop stalks.

In accordance with an exemplary embodiment of the present invention, the textured outer surface includes corrugations, straight flutes, spiral flutes, ribs or protrusions to enhance the flow of crop therethrough without damaging crop. For example, as shown in FIG. 4, the rollers 310A', 310B' include a plurality of corrugations 316A', 316B' positioned and arranged in a complementary manner with one another such that the corrugations 316A' of the first roller 310A' mesh with the corrugations 316B' of the second roller 310B'.

Figure 6A:
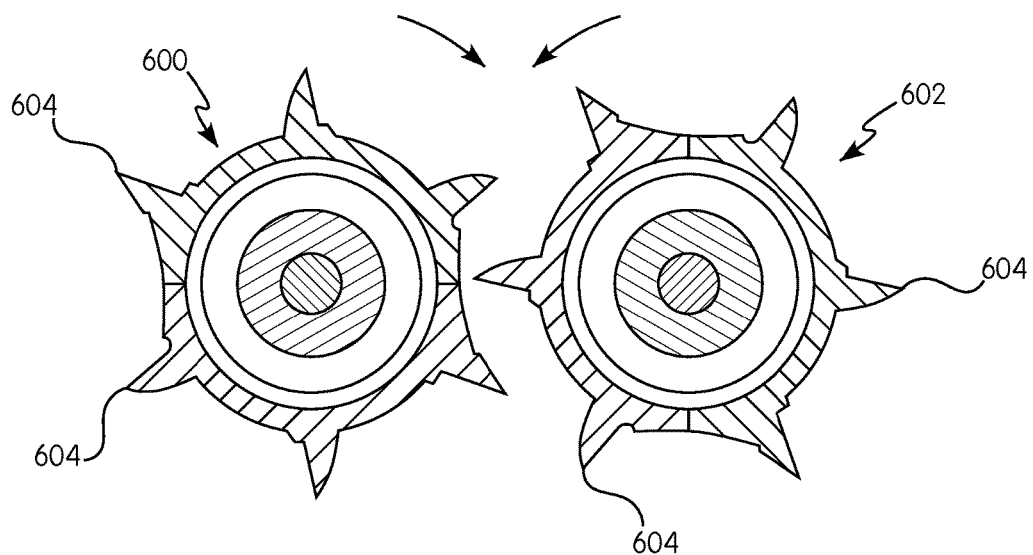
FIG. 6A is a cross-sectional front elevational view of a pair of rollers in accordance with an exemplary embodiment of the present invention.

In accordance with an exemplary embodiment of the present invention, FIG. 6A illustrates a series of longitudinally extending, angularly spaced flutes 604 mounted on the cylindrical body of each roller 600, 602 such that the flutes 604 of one of the rollers cooperate with the flutes 604 of the other roller in a gripping action to drive the crop therethrough. Alternatively, the plurality of flutes 604 can be timed to be non-meshing and horizontally opposite of each other thereby causing the flute edges to pinch the stalk simultaneously as they rotate, thus providing that the resultant equal forces are applied to both sides of the engaged stalk so as to eliminate whipping of the plant. This keeps the stalk perpendicular and reduces any whipping action that may prematurely dislodge the ear from the corn stalk or damage the stalk. The flutes 604 can be oriented such that they pinch the corn stalk, pulling it down and rearwardly so that ears or corn are removed from the stalks as they come into contact with the deck plates.

Figure 6B:
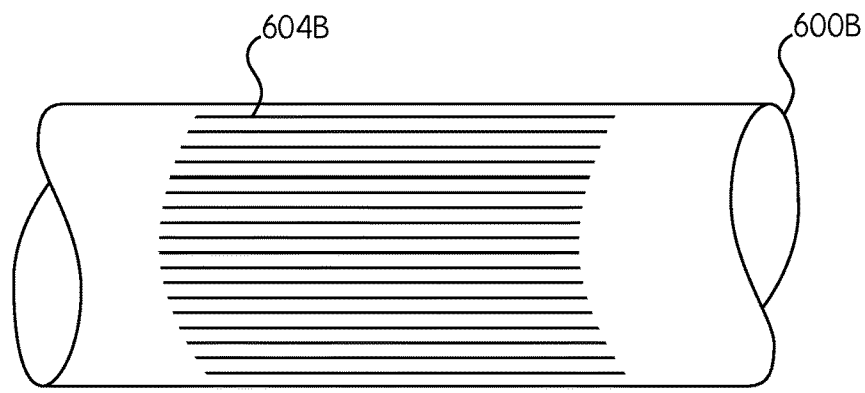
FIG. 6B is a simplified partial side view of a roller in accordance with another exemplary embodiment of the present invention.
Figure 6C:
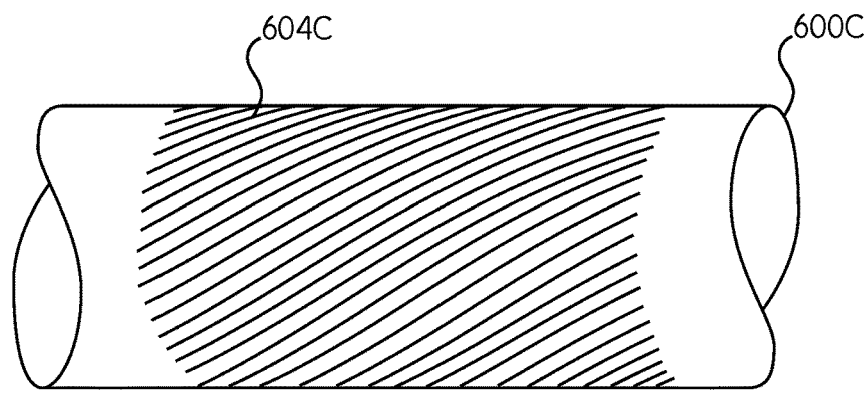
FIG. 6C is a simplified partial side view of a roller in accordance with yet another exemplary embodiment of the present invention.
Figure 6D:
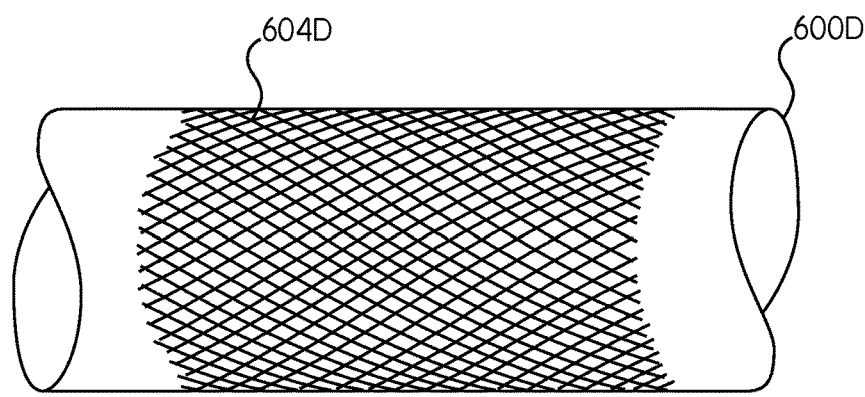
FIG. 6D is a simplified partial side view of a roller in accordance with another exemplary embodiment of the present invention.

FIGS. 6B-6D illustrate several different types of rollers in accordance with exemplary embodiments of the present invention. In FIG. 6B, the flutes on roller 600B are configured as a series of straight flutes 604B spaced from one another for gripping and pulling crop into the harvester. Alternatively, as shown in FIG. 6C, the flutes on roller 600C are configured as a series of spiral flutes 604C arranged for gripping and pulling crop into the harvester. In FIG. 6D, the flutes on roller 600D are configured as knurled flutes 604D to improve gripping and pulling of crop into the harvester. It is to be understood that the flutes can alternatively be any other flute configurations sufficient for their purpose of gripping and pulling the crop into the harvester.

Figure 7:
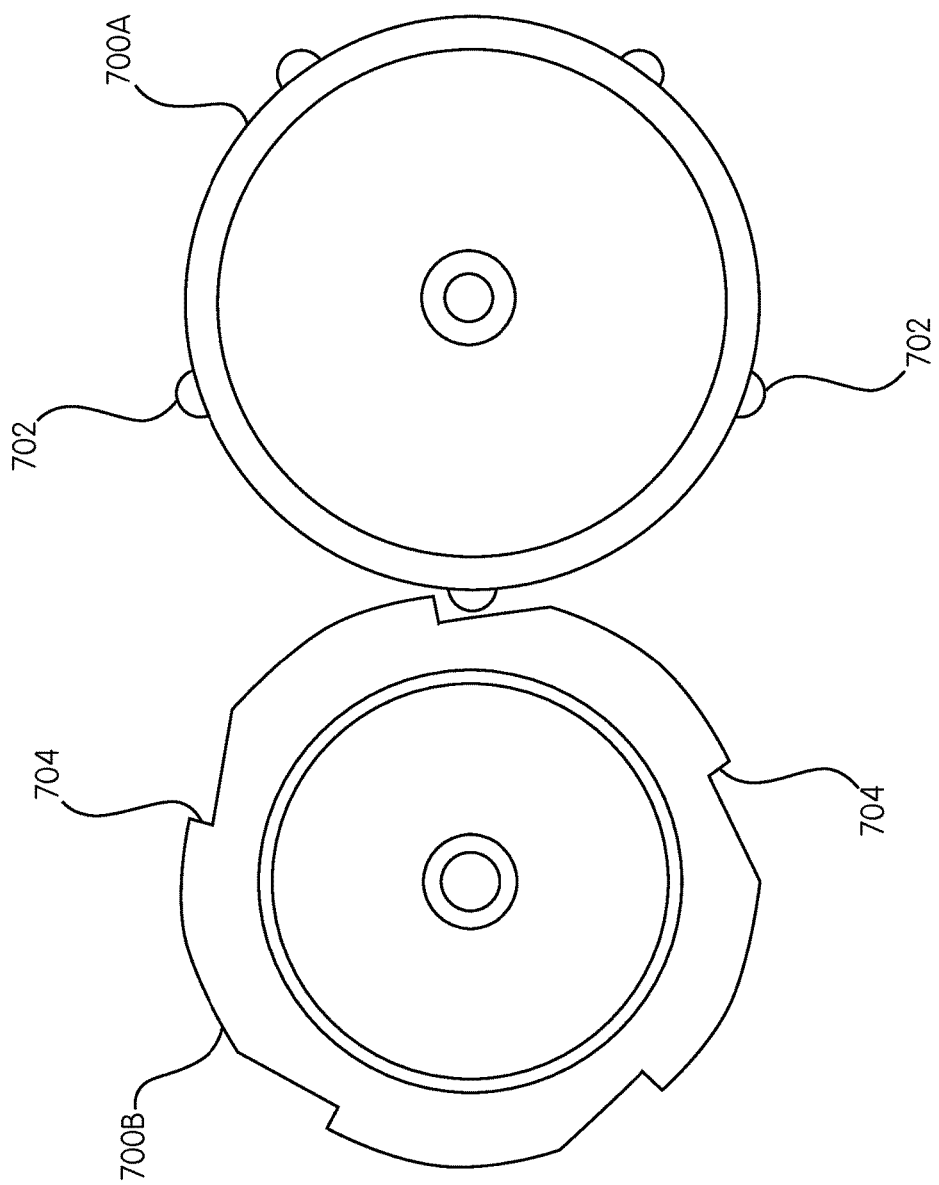
FIG. 7 is a front elevation view of a pair of rollers in accordance with an exemplary embodiment of the present invention.

In accordance with yet another exemplary embodiment of the present invention, FIG. 7 illustrates a series of longitudinally extending, angularly spaced plurality of ribs 702 mounted on first roller 700A. Each rib 702 may be configured as an elongate metal bar welded to first roller 700A so as to extend along the full length of the roller. The plurality of ribs 702 may be slightly helical along the cylindrical body of roller 700A. The outer surface of second roller 700B is formed with a plurality of grooves 704 for receiving the plurality of ribs 702. The grooves 704 are positioned along a length of second roller 700B so as to receive the ribs 702 from first roller 700A. In an exemplary embodiment, the ribs 702 and grooves 704 are evenly spaced around a peripheral surface of each of the rollers 700A, 700B. The ribs 702 and grooves 704 used in this design provide positive feeding as the rollers rotate in the direction of the crop material.

Figure 8:
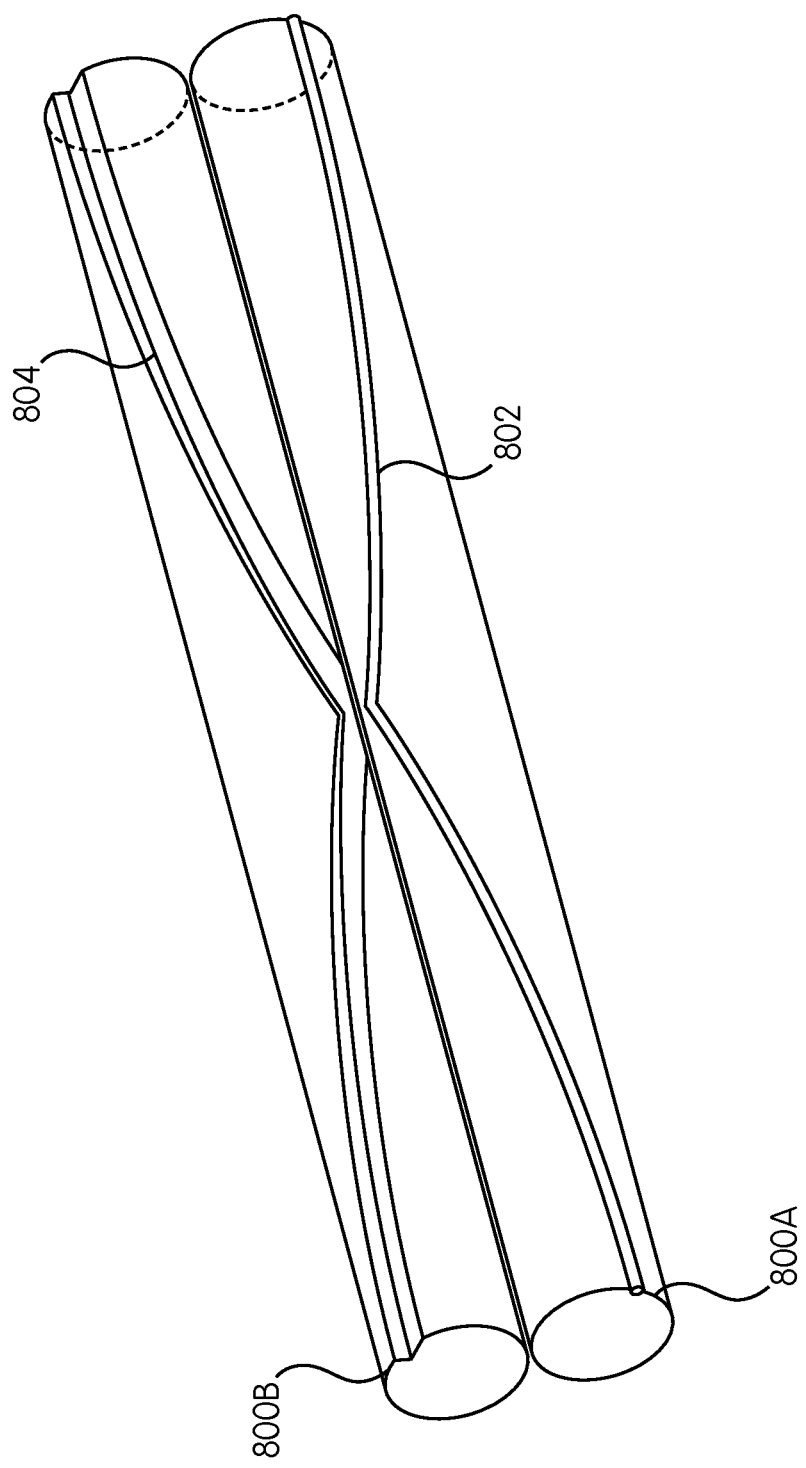
FIG. 8 is a perspective view of a pair of rollers in accordance with another exemplary embodiment of the present invention.

FIG. 8 illustrates another exemplary embodiment with rollers 800A, 800B having a single rib 802 and a single groove 804.

In an exemplary embodiment, the ribs can be formed of a wear resistant material or flexible plastic to increase durability. The height and the number of ribs may be changed if a more or less aggressive action is required. The ribs may be arranged in a different manner to increase the aggressive action of the ribs on the crop material so as to drive the crop more vigorously. The ribs and grooves on the surface of the rollers may be arranged in different patterns depending on the type of crop being harvested and the desired aggressiveness of the rollers.

The rollers may be modified by the addition of an elastomeric coating to enhance the gripping characteristics of the rollers, thereby facilitating movement of the stalk through the harvester.

Figure 9:
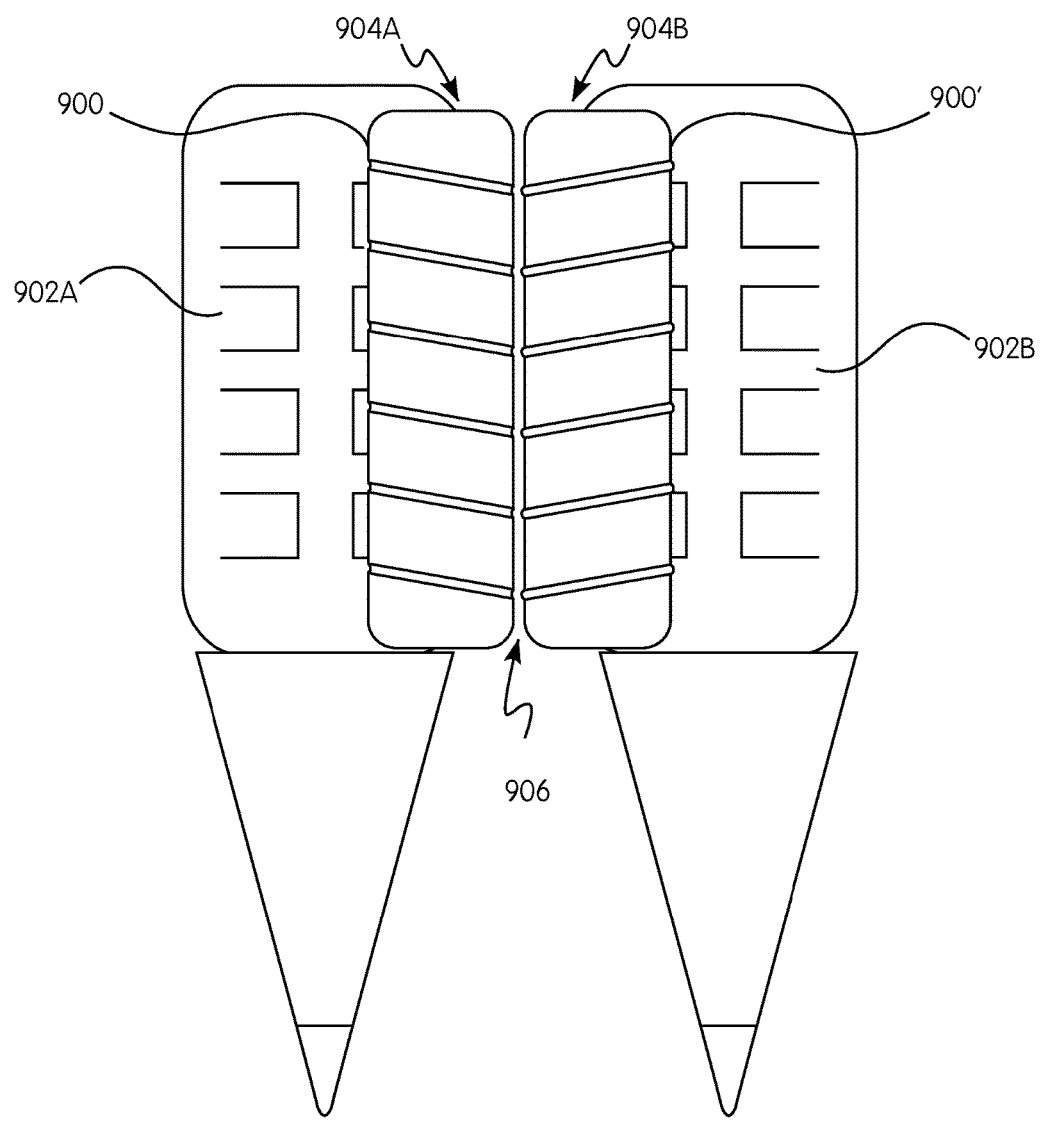
FIG. 9 is a simplified top view of inflatable sleeves for a pair of rollers applicable to the present invention in accordance with an exemplary embodiment.

In accordance with another exemplary embodiment of the present invention, as shown in FIG. 9, the pair of rollers 904A, 904B mounted to respective hoods 902A, 902B include a sleeve 900 for circumscribing a respective roller. The sleeve 900 can be constructed of a resilient, yieldable or flexible and air tight material such as an elastomer e.g., rubber. The sleeve 900 is advantageously constructed of a resilient, yieldable or flexible material such as rubber to allow for stalks of crops to pass between the rollers. It is contemplated, however, that other configurations for the sleeve could be used. For example, the sleeve could be constructed of any other suitable resilient material.

In accordance with another exemplary embodiment of the present invention, the sleeve 900 is configured as an inflatable sleeve 900' circumscribing a respective roller. The inflatable sleeve 900' is constructed of a resilient and air tight material such as rubber to allow for adjustment of the air pressure for the inflatable sleeve. Advantageously, the inflatable sleeve is constructed of a polymer e.g., an elastomeric base material which is sealed against loss of air and inflatable to a desired pressure.

The inflatable sleeve 900' is inflated to relatively low pressures such that they can draw stalks of crops between them without crushing the crop. The inflatable sleeve 900' can be adjustably inflated and deflated to change the width of gap 906 between the first roller 904A and the second roller 904B depending on the particular crop being harvested or as desired by the operator for particular harvesting operations. Inflation and deflation of the inflatable sleeve 900' correlates to a change in the diameter of roller 904B. For example, as the inflatable sleeve 900' is inflated with air, the diameter of the roller 904B increases. The increased diameter of the roller 904B results in a decreased gap width 906 between the first roller 904A and the second roller 904B. Similarly, as the inflatable sleeve 900' is deflated, the diameter of the roller 904B decreases. Therefore, the reduced diameter of the roller 904B results in an increased gap width 906 between the first roller 904A and the second roller 904B. In accordance with exemplary embodiments, the air pressure of the inflatable sleeve 900' is about 4-16 psi, about 8-14 psi, or about 10-12 psi.

The air pressure of the inflatable sleeve 900' is increased or decreased to adjust how strongly crop material passing therethrough is grabbed by the rollers 904A, 904B. The desired gripping strength for the rollers 904A, 904B can vary depending on the particular type of crop being harvested and other characteristics such as the size and strength of the ears of the crop. For example, a higher air pressure is advantageous for crops with strongly attached ears because of the additional gripping strength provided.

Referring back to FIG. 3, the first and second rollers 310A, 310B are arranged parallel to one another to make an opposing pair. The rollers 310A, 310B are mounted to respective first and second hoods 304A, 304B spaced apart from one another. Specifically, the rollers 310A, 310B are movably mounted to their respective hoods and in approximate parallel alignment with the stalk rolls 206A, 206B. As such, the pair of rollers 310A, 310B have longitudinal axes that are substantially parallel or parallel with longitudinal axes of the pair of stalk rolls 206A, 206B.

In accordance with an exemplary embodiment of the present invention, as shown in FIG. 3, the rollers 310A, 310B can be rotatably secured to a support member 320A extending horizontally along a length of the back of the frame 302. For example, the support member 320A can extend between respective ends of the frame. Similarly, another support member 320B can extend across a length of the front of the frame 302 for rotatably securing an opposite end of the rollers 310A, 310B. The support members 320A, 320B are adjustably fastened to the rollers 310A, 310B and rotatably secure and structurally support the rollers 310A, 310B. It is to be understood that the support members 320A, 320B can also be constructed of multiple segments arranged side-by-side over a collective length of the frame 302. Additionally, the rollers 310A, 310B may be supported on their ends by support arms mounted to respective first and second hoods 304A, 304B via a mounting plate.

Figure 10:
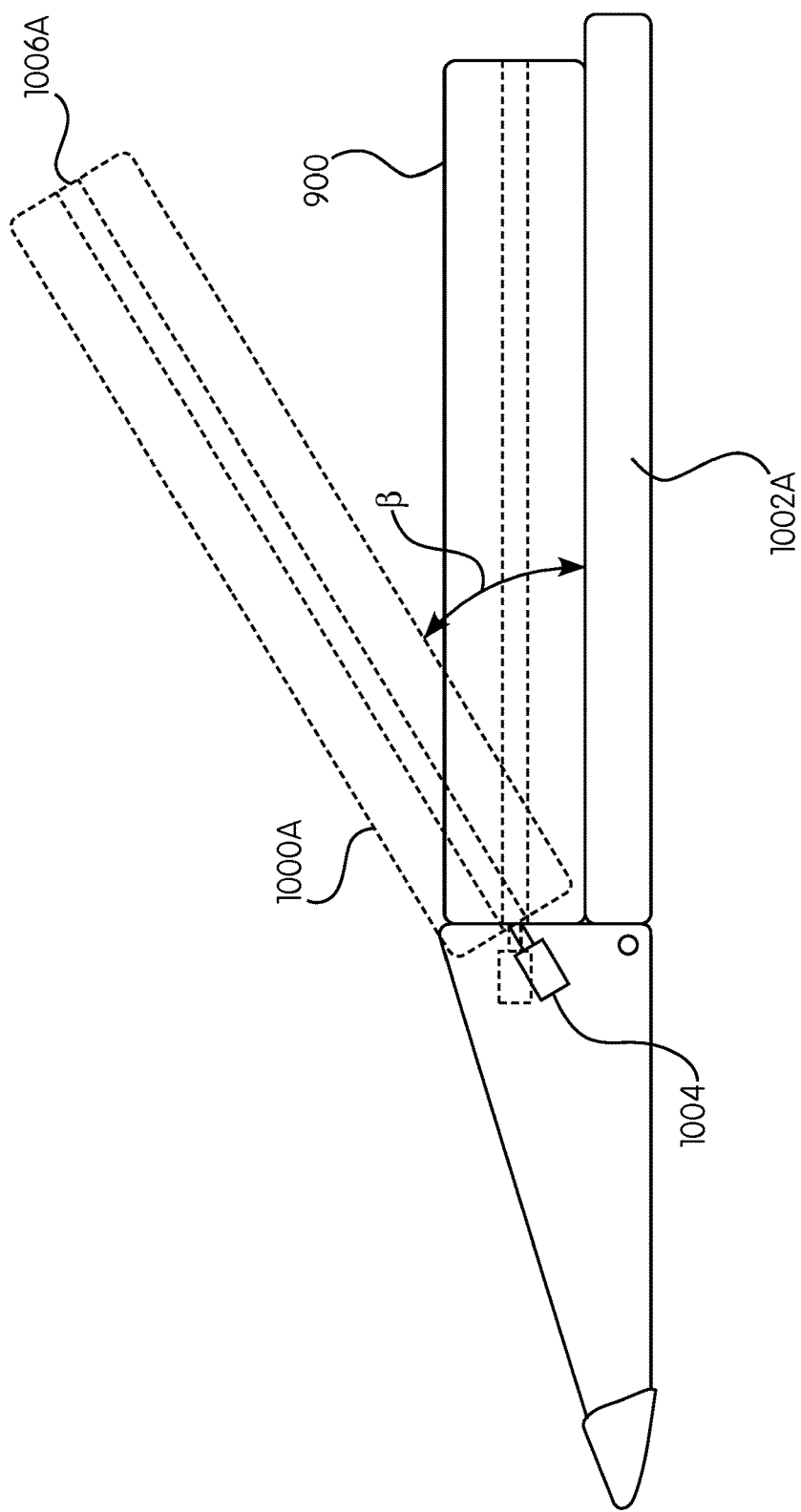
FIG. 10 is a side view of a row unit of a header in accordance with yet another exemplary embodiment of the present invention.

In accordance with another exemplary embodiment of the present invention, as shown in FIG. 10, the roller 1000A can be mounted in a cantilevered manner for rotation by drive shaft 1006A, thereby eliminating the need for support brackets or bearings. For purposes of illustration, only roller 1000A of the pair of rollers is illustrated.

Referring back to FIG. 3, each roller assembly 306, 308 includes an actuator 312A, 312B for moving the respective rollers 310A, 310B between first and second positions. Specifically, each of the first and second hoods 304A, 304B is respectively connected to the actuator 312A, 312B for moving a respective roller 310A, 310B of the pair of rollers. The actuator 312A, 312B is configured as a piston or cylinder type actuator, but optionally can be an electronic, pneumatic or hydraulic device, as desired. The actuator 312A, 312B can alternatively be configured as any other actuator suitable for its intended purpose of moving the rollers between first and second positions. In accordance with an exemplary embodiment, the actuators 312A, 312B can move the rollers 310A, 310B to increase or decrease the gap 314 between the rollers 310A, 310B depending on the type of crop being harvested and the particular crop conditions. As further discussed below, the actuators 312A, 312B are operatively connected to a control unit 112 (FIG. 1) of the combine harvester to move the respective rollers 310A, 310B between first and second positions.

Additional actuators or hydraulic cylinders can be mounted at various locations for additional positioning of rollers 310A, 310B. As shown in FIG. 3, the rollers 310A, 310B are shown as arranged having longitudinal axes that are parallel with longitudinal axes of the pair of stalk rolls 206A, 206B. In accordance with an exemplary embodiment of the present invention, the rollers can be moved higher or lower in a vertical direction such that the rollers can engage a higher portion of the crop being harvested.

Analogously, the front ends of the rollers could be positioned in an adjustable manner such that they are positioned higher or lower in a vertical direction than their back ends. Thus, the vertical and/or fore-aft position of one or both ends of the rollers is separately adjusted by a respective actuator or hydraulic cylinder. For example, as shown in FIG. 10, the roller 1000A can adjustably pivot between a horizontal position and a non-horizontal or angled position. The roller 1000A can also be adjustably positioned at intermediate positions between the horizontal and vertical positions, thereby creating an acute angle β of 0-90 degrees between a top surface of the hood 1002A and the respective roller 1000A. It is to be understood that the roller 1000A can be adjustably moved to other positions based on the type of crop being harvested and operator preference during harvesting operations.

During operation, the rollers rotate to guide crop material e.g., stalks or ears, into the row unit. As shown in FIG. 10, the roller 1000A is operatively powered by a drive mechanism 1004 e.g., a motor, a hydraulic means, or electrically driven for rotation at a constant or variable speed, or any other power means suitable for the foregoing intended use, such as but not limited to being mechanically powered e.g., by chain/belt drive. The speed of the roller 1000A can be adjusted based on the type of crop being harvested and the harvesting conditions to maximize crop yield.

Referring back to FIG. 3, the rotational speed of the first roller 310A can be matched to the rotational speed of the second roller 310B to facilitate movement of the stalks through the harvester. The rotational speeds are coordinated such that an outer surface of the first roller 310A complements an outer surface of the second roller 310B. For example, in an exemplary embodiment of the present invention, the rotational speeds of the rollers match to allow for a plurality of ribs on the first roller to match with a plurality of grooves on the second roller. Coordinating the rotational speeds of the rollers 310A, 310B facilitates movement of stalks through the harvester. The revolution distance for each of the rollers 310A, 310B is proportionally matched to the revolution distance for each of the stalk rolls 206A, 206B.

In accordance with another exemplary embodiment of the present invention, the pair of rollers 310A, 310B can be configured as freely rotating rollers. In such an embodiment, the pair of rollers 310A, 310B provide an active surface for upper portions of corn stalks to reduce ear bouncing and damage to crops. As corn stalks enter the combine harvester, the upper portions of stalks abut the outer surfaces of each roller 310A, 310B thereby causing rotation of each roller 310A, 310B. Therefore, the rollers 310A, 310B provide a freely rotatable guide surface for stalks as they pass through the combine harvester.

Referring back to FIG. 1, the combine harvester 100 includes the control unit 112, e.g., a computer, which can include a microprocessor based circuit. The control unit 112 may include one or more processors, computer readable memories locally or remotely e.g., cloud based, input/output modules, and other common components.

In accordance with an exemplary embodiment of the present invention, the control unit 112 is positioned on the header or the combine, and operatively connected to the header 300 and its components including the rollers 310A, 310B and their respective drive shafts, inflatable sleeve 900', and/or plurality of actuators 312A, 312B for adjustably positioning the rollers 310A, 310B. The control unit 112 includes or is operatively associated with a non-transitory computer readable medium having stored thereon computer instructions that, when executed by a processor, cause operational movement of the rollers 310A, 310B. The computer instructions when executed cause the rollers 310A, 310B to be adjusted between a plurality of positions and rotational speeds based upon the type of crop being harvested and operator preference. The control unit 112 receives input from the operator of the combine harvester and adjusts the position and rotational speed of the rollers for efficient harvesting operations. The control unit 112 is operatively connected to and in communication with the plurality of actuators 312A, 312B for adjusting the position of the rollers, the rollers 310A, 310B for adjusting the speed of the rollers, and the inflatable sleeve 900' to adjust the elongated gap 314 between the rollers 310A, 310B.

In an alternative exemplary embodiment of the present invention, the control unit 112 can be operatively connected to a plurality of sensors 110 positioned about various locations of the header 300. Although the header 300 as shown is configured to have sensors 110 along the header frame 302, additional sensors may be placed at additional locations along the width of the header e.g., adjacent the rollers 310A, 310B. The sensors 110 are operatively in communication with the control unit 112 of the combine harvester 100.

The position and rotational speed of the rollers 310A, 310B can be automatically adjusted based on feedback from the sensors 110. The one or more sensors 110 may sense the amount of crop material passing through the combine harvester at various locations, thereby enabling the operator to automatically adjust the position and speed of the rollers based on feedback signals from the one or more sensors 110 on the header 300. For example, if the sensors 110 detect an increased accumulation of crop material, the rotational speed of the rollers 310A, 310B may be increased to facilitate processing of crop material. The sensors 110 may be configured as moisture level sensors to determine the amount of moisture accumulated on corn stalks. The amount of moisture level on the corn stalks may be indicative of the strength of the ears of the stalks. Therefore, for example, if the sensors 110 detect decreased moisture levels, the rotational speed and position of the rollers 310A, 310B may be adjusted to decrease the aggressiveness of the rollers on stalks passing through the combine harvester. It is to be understood that feedback from other types of sensors may be utilized for determining the position and rotational speed of the rollers during harvesting operations.

In sum, the control unit 112 is operatively connected to the rollers 310A, 310B and their respective drive shafts, inflatable sleeve 900', and the plurality of actuators 312A, 312B for adjustably positioning the rollers 310A, 310B. The control unit 112 can be integrated with a controller of the combine harvester 100 and operatively connected to the header 300. As such, the rollers and their respective components can be remotely controlled by an operator from the cab of the combine harvester 100. During harvesting operations, the operator can adjust the position of the rollers and their rotational speed without interrupting harvesting operations.

Alternatively, prior to placing the combine harvester 100 into operation, the operator can input into the control unit 112 predetermined positions and a predetermined rotational speed for the rollers, as well as a desired air pressure for rollers having the inflatable sleeve 900' based on the type of crop being harvested and the harvesting conditions. Additionally, the operator may modify the predetermined parameters to better suit his or her needs. It is contemplated that the positioning of the roller assemblies may be performed remotely during operation of the header by an operator, or automatically by the sensors 110.

During typical harvesting operations, the stalk rolls rotate to guide the stalks and ears of crop into the row unit. The stalks are pulled downward and ears of corn are continuously stripped. When the crop is pulled into the header, the ears are accelerated to the speed of the stalk rolls. As such, plants may bend, fold, or collide with various parts of the header 300 including the hoods 304A, 304B or the deck plates 208A, 208B. As a result, some plants bend and snap such that ears can be lost when the stalks are pulled into the header.

The rollers 310A, 310B are mounted to the hoods 304A, 304B of the header 300 and create a moving surface above the stalk rolls 206A, 206B. As the rollers 310A, 310B rotate, they guide the stalks and ears into the row unit 200A. The rotational speed of the rollers 310A, 310B can be fixed or variable depending on the type of crop being harvested and the harvesting conditions. In addition to actively pulling the stalk into the header by creating a moving surface above the stalk rolls, the rollers 310A, 310B firmly hold the stalk and keep the ears under control as they move through the row unit 200A. Specifically, the upper portion of the stalks pass through the elongated gap 314 between the rollers 310A, 310B. The outer surface of the rollers 310A, 310B, whether smooth or textured, is designed to firmly hold and guide the upper portions of the stalk as they pass through the row unit.

During a single harvesting operation, the operator can adjust the elongated gap 314 between the rollers 310A, 310B by moving the position of the rollers. Additionally, the elongated gap 314 can be adjusted by increasing or decreasing the air pressure in the inflatable sleeve 900' of each roller. Finally, the aggressiveness of the rollers can be adjusted by changing the rotational speed of the rollers or the air pressure in the inflatable sleeve. The elongated gap 314 between the rollers 310A, 310B is adjustable such that different sizes of ears can be accommodated, while narrow enough to capture ear and loose grain once it is under the roller.

The rollers 310A, 310B work in conjunction with the stalk rolls 206A, 206B to pull stalks into the row unit during harvesting. Desirably, there is a proportional relationship between the rotational speed of the stalk rolls 206A, 206B and the rotational speed of the rollers 310A, 310B. Therefore, when the respective upper portions and lower portions of the stalk are drawn into the harvester, the pulling force from the rollers and the stalk rolls is coordinated to ensure that the corn stalk is firmly held by the rollers as it advances in the combine harvester and to prevent damage to the ears of corn stalks.

Various modifications can be made to the above described design and additional configurations may be utilized for determining the optimal position and speed of the rollers in a given harvesting operation. For example, the rollers may be rotated in opposite directions to assist in pulling the corn stalks downwardly through the rollers so that the ears of corn are snapped off by the deck plates located above the stalk rolls and below the rollers.

While the present invention has been described with reference to the foregoing exemplary embodiments, it will be appreciated by those skilled in the art that various changes may be made and equivalents may be substituted for elements thereof without departing from the scope of the present invention. In addition, modifications may be made to adapt a particular situation or material to the teachings of the present invention without departing from the essential scope thereof. It is to be understood, therefore, that the present invention not be limited to the particular aspects disclosed, but it is intended to cover modifications within the spirit and scope of the present invention as defined by the appended claims.

We claim:

1. A header of a combine harvester comprising:
   a frame;
   a row unit extending forwardly of the frame, the row unit including a pair of stalk rolls and a pair of deck plates; and
   a pair of rollers spaced from and above the pair of stalk rolls, wherein the pair of rollers are formed from a pliable material.

2. The header of claim 1, wherein each of the pair of rollers are spaced from each other defining a gap.

3. The header of claim 2, wherein the gap defined by the pair of rollers is vertically aligned with a gap defined by the pair of stalk rolls.

4. The header of claim 2, wherein the gap defined by the pair of rollers is larger than a gap defined by the pair of stalk rolls.

5. The header of claim 1, wherein the pair of rollers have longitudinal axes that are parallel with longitudinal axes of the pair of stalk rolls.

6. The header of claim 1, wherein the pair of rollers are powered rollers.

7. The header of claim 1, wherein each of the pair of rollers have a smooth or textured outer surface.

8. The header of claim 7, wherein the textured outer surface includes corrugations, straight flutes, spiral flutes, ribs or protrusions.

9. The header of claim 1, wherein each of the pair of rollers includes an inflatable sleeve circumscribing the roller.

10. The header of claim 1, further comprising first and second hoods covering the row unit, and wherein the pair of rollers are mounted to the first and second hoods.

11. The header of claim 10, wherein one of the pair of rollers is mounted to the first hood and the other of the pair of rollers is mounted to the second hood.

12. The header of claim 11, wherein each of the pair of rollers are movably mounted to the respective first and second hood to adjust a gap between the pair of rollers.

13. The header of claim 11, wherein each of the first and second hoods includes an actuator for moving a respective roller of the pair of rollers.

14. The header of claim 10, wherein each of the pair of rollers is cylinder shaped.

15. The header of claim 14, wherein each hood includes a pair of concave surfaces corresponding to the cylinder shape of each roller.

16. A header of a combine harvester comprising:
   a frame;
   a plurality of row units extending forwardly from the frame;
   first and second spaced apart hoods, each hood extending between an adjacent pair of row units;
   a first roller assembly mounted to the first hood, the first roller assembly including a first roller and a first actuator to move the first roller between first and second positions; and
   a second roller assembly mounted to the second hood, the second roller assembly including a second roller and second actuator to move the second roller between first and second positions.

17. The header of claim 16, wherein the first and second rollers define a gap therebetween spaced from and in vertical alignment with a gap defined by a pair of stalk rolls of one of the plurality of row units.

18. The header of claim 16, wherein the first and second rollers include a textured outer surface selected from a group consisting of corrugations, straight flutes, spiral flutes, ribs, and protrusions.

19. The header of claim 16, wherein the first and second rollers each have a smooth outer surface.

20. The header of claim 16, wherein the first and second rollers are powered.

* * * * *